US010493306B2

(12) United States Patent
Richardson

(10) Patent No.: US 10,493,306 B2
(45) Date of Patent: *Dec. 3, 2019

(54) HIGH-VISIBILITY LOCKING LEVERS FOR FIRE HOSE COUPLINGS

(71) Applicant: Mercedes Textiles Ltd., St. Laurent (CA)

(72) Inventor: Robert Richardson, Cookshire (CA)

(73) Assignee: Mercedes Textiles Ltd., St. Laurent, Quebec (CA)

( * ) Notice: Subject to any disclaimer, the term of this patent is extended or adjusted under 35 U.S.C. 154(b) by 99 days.

This patent is subject to a terminal disclaimer.

(21) Appl. No.: 15/897,529

(22) Filed: Feb. 15, 2018

(65) Prior Publication Data

US 2019/0070446 A1 Mar. 7, 2019

Related U.S. Application Data

(63) Continuation of application No. 13/394,725, filed as application No. PCT/CA2010/001410 on Sep. 13, 2010, now Pat. No. 9,895,562.

(60) Provisional application No. 61/243,757, filed on Sep. 18, 2009.

(51) Int. Cl.
| F16L 37/113 | (2006.01) |
| A62C 33/04 | (2006.01) |
| F16L 35/00 | (2006.01) |
| F16L 37/252 | (2006.01) |

(52) U.S. Cl.
CPC .............. *A62C 33/04* (2013.01); *F16L 35/00* (2013.01); *F16L 37/252* (2013.01); *F16L 2201/60* (2013.01); *Y10T 29/49815* (2015.01); *Y10T 29/49826* (2015.01)

(58) Field of Classification Search
CPC ....... F16L 37/113; F16L 37/252; F16L 37/248
USPC ........................................................ 285/401
See application file for complete search history.

(56) References Cited

U.S. PATENT DOCUMENTS

| 489,107 A | 1/1893 | Storz |
| 4,643,459 A | 2/1987 | Carson |
| 4,648,630 A | 3/1987 | Bruch |
| 5,251,940 A | 10/1993 | DeMoss et al. |
| 5,301,985 A | 4/1994 | Terzini |
| 5,344,193 A | 9/1994 | Rio |
| 5,586,691 A * | 12/1996 | Gotch .................. B67D 1/0872 222/113 |
| 6,102,444 A | 8/2000 | Kozey |
| 6,519,901 B1 | 2/2003 | Nelson et al. |

(Continued)

OTHER PUBLICATIONS

International Search Report (Form PCT/ISA/210) of International Application No. PCT/CA2010/001410 dated Jan. 4, 2011 (2 pages).

*Primary Examiner* — Aaron M Dunwoody
(74) *Attorney, Agent, or Firm* — Ware, Fressola, Maguire & Barber LLP

(57) ABSTRACT

A fire hose coupling, such as a quarter-turn Storz-style coupling, has a substantially annular body having a first end connected to a fluid-carrying conduit and a second end for connecting to another coupling. The fire hose coupling also includes at least one locking lever movable between an unlocked position and a locked position. The lever locks the annular body of the coupling to the other coupling. The locking lever has a light-reflecting surface to improve visibility of the lever. This facilitates assembly and disassembly of the couplings in conditions of poor visibility.

11 Claims, 2 Drawing Sheets

(56) References Cited

U.S. PATENT DOCUMENTS

| | | |
|---|---|---|
| 6,672,792 B1 | 1/2004 | Schipani et al. |
| 2004/0201215 A1 | 10/2004 | Steingass |
| 2006/0027188 A1* | 2/2006 | Hurwitz ............... A01K 27/006 <br> 119/795 |
| 2006/0077652 A1* | 4/2006 | Theus ................... E03C 1/0404 <br> 362/96 |
| 2007/0063512 A1 | 3/2007 | Tamez, Jr. |
| 2009/0278233 A1* | 11/2009 | Pinnington ....... H01L 21/02389 <br> 257/615 |
| 2010/0083912 A1* | 4/2010 | Hurwitz ............... A01K 27/006 <br> 119/792 |
| 2012/0006419 A1* | 1/2012 | Richardson ............ A62C 33/00 <br> 137/15.01 |
| 2012/0211974 A1* | 8/2012 | Richardson ............ A62C 33/00 <br> 285/93 |
| 2012/0279319 A1* | 11/2012 | Boukallel ............... G01L 1/106 <br> 73/862.59 |
| 2013/0048133 A1* | 2/2013 | Richardson ............ A62C 33/04 <br> 138/109 |
| 2015/0292693 A1* | 10/2015 | Franke ................. F21V 33/004 <br> 362/101 |

\* cited by examiner

HIGH-VISIBILITY LOCKING LEVERS FOR FIRE HOSE COUPLINGS

CROSS-REFERENCE TO RELATED APPLICATIONS

This application is a continuation of U.S. patent application Ser. No. 13/394,725 filed on Apr. 17, 2012 and issued as U.S. Pat. No. 9,895,562 on Feb. 20, 2018, which is a U.S. National Stage Entry of international patent application serial no. PCT/CA2010/001410, filed Sep. 13, 2010, which claims benefit to provisional patent application Ser. No. 61/243,757, filed Sep. 18, 2009. Each of the above-referenced applications are incorporated by reference in their entireties.

TECHNICAL FIELD

The present technology relates generally to fire hose couplings and, in particular, to Storz-style fire hose couplings.

BACKGROUND

Fire hoses are coupled together with fire hose couplings. These couplings are well known in the art. Typically, one side of a coupling has an expansion ring to attach the coupling to its respective hose. On the other side of the coupling are usually a set of internal or external threads for fastening the coupling to complementary (external or internal) threads of another coupling. In addition to these male and female couplings, there also exist so-called "sexless couplings" such as the Storz-style couplings which employ shanks and clamps to attach to the hose and interconnecting lugs to fasten one coupling to another. The Storz-style couplings may include locking levers to lock these couplings together so as to preclude the couplings from becoming accidentally disconnected.

When operating at night or in conditions of poor visibility, however, these locking levers may be difficult to find or locate. When visibility is poor, a firefighter typically relies on tactile sensation (touch) to find the levers. However, this is particularly difficult when wearing firefighting gloves.

Accordingly, a need remains for an improved fire hose coupling that addresses this technical problem.

SUMMARY

In general, the present invention provides a fire hose coupling having high-visibility locking levers that can be seen in conditions of poor visibility. These high-visibility levers have a light-reflecting surface that may be made of a super reflective, photo luminescent or phosfluorescent material. Other coatings, paints, tapes, films, etc. that provide extremely high reflectivity or brightness may be used as well. This light-reflecting surface makes the lever more visible in conditions of poor visibility (e.g. at night or in a dark or smoke-filled environment).

Thus, a main aspect of the present invention is a fire hose coupling comprising a substantially annular body having a first end connected to a fire hose and a second end having internal engagement lugs for connecting to lugs on another coupling and at least one locking lever movable between an unlocked position and a locked position, the lever locking the annular body of the coupling to the other coupling, wherein the at least one locking lever comprises a light-reflecting surface to improve visibility of the at least one lever.

Another aspect of the present invention is a fire hose assembly comprising a first fire hose having a first coupling, wherein the first coupling comprises a body having a first set of internal lugs, a second fire hose having a second coupling having a second set of internal lugs adapted to be mechanically coupled to the first set of internal lugs on the first coupling to connect the first coupling to the second coupling. The assembly also includes first and second locking levers disposed on the first and second couplings, respectively, for locking the first coupling to the second coupling when the first set of internal lugs is connected to the second set of internal lugs. One or both of the first and second locking levers comprises a light-reflecting surface to improve visibility of each lever.

Yet another aspect of the present invention is a method of method of facilitating assembly of fire hoses in conditions of poor visibility. The method entails providing a first fire hose having a first coupling, wherein the first coupling comprises a body having a first set of internal lugs and providing a second fire hose having a second coupling having a second set of internal lugs adapted to be mechanically coupled to the first set of internal lugs on the first coupling. The method then involves connecting the first coupling to the second coupling, observing high-visibility locking levers on the first and second couplings and locking the first coupling to the second coupling.

Yet another aspect of the present invention is a method of method of facilitating disassembly of fire hoses in conditions of poor visibility. The method entails providing a first fire hose having a first coupling, wherein the first coupling comprises a body having a first set of internal lugs connected to a second set of internal lugs on a second coupling to which a second fire hose is attached. The method further involves observing high-visibility locking levers on the first and second couplings, unlocking the first coupling from the second coupling, and disconnecting the first coupling from the second coupling.

The details and particulars of these aspects of the invention will now be described below, by way of example, with reference to the attached drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

In general, the present invention provides a fire hose coupling (or "coupler") with high-visibility locking levers. These locking levers are intended to be visible even in conditions of poor visibility such as, for example, at night or in a dark and/or smoke-filled environment. This technology is primarily intended to be used with a Storz-style coupling but may applicable to other types of couplings that use locking levers.

The locking levers may have a light-reflecting surface to enhance visibility. This light-reflecting surface may be made of a super reflective, photo luminescent or phosfluorescent material (e.g. fluorescent tape). Other coatings, paints, tapes, metallic films, etc. that provide extremely high reflectivity or brightness may be used as well. As will be appreciated, various combinations of light-reflecting materials may be used to achieve any desired visual effect. This light-reflecting surface makes the locking levers more likely to be seen in conditions of poor visibility (e.g. in a dark or smoke-filled environment).

Figure 1:
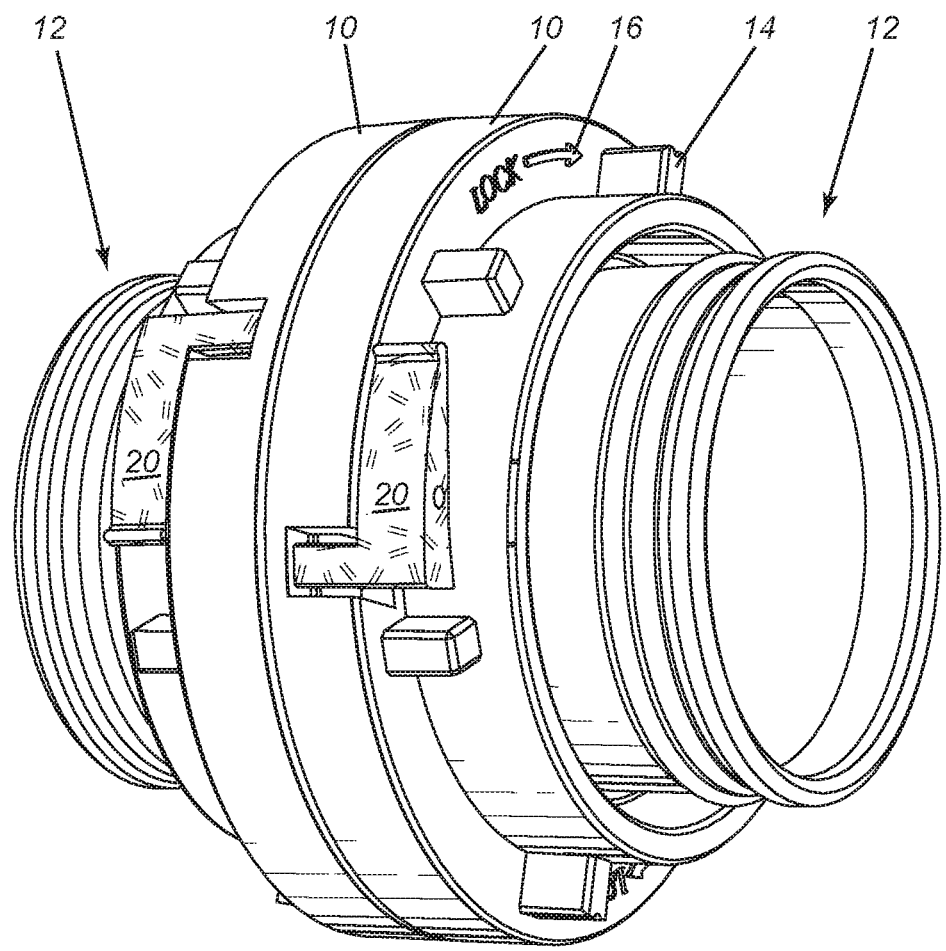
FIG. 1 is an isometric view of a pair of connected Storz-style couplings having high-visibility locking levers in accordance with an embodiment of the present invention.

FIG. 1 is an isometric view of a pair of connected Storz-style couplings each designated by reference numeral 10 in accordance with one embodiment of the present invention. As shown by way of example, each Storz coupling 10 has a substantially annular body having a first end 12 adapted to attach to a fire hose and a second end having internal lugs (not shown, but standard on Storz-style couplings). Typically, these Storz-style (sexless) couplings may be quarter-turn couplings in that they require a turn of 90 degrees to fully engage the internal lugs to the other coupling. External lugs 14 may be provided to facilitate connection of the couplings together. A directional arrow 16 or other such indication may be inscribed on the annular body of the coupling to inform the user of the proper direction to turn the coupling in order to connect its lugs to the other coupling. As shown in FIG. 1, the coupling has one or more high-visibility locking levers 20 to enhance visibility of the levers. The high-visibility locking levers 20 may have a light-reflecting outer surface made of a super reflective metal film, a photo luminescent coating, or a phosfluorescent coating. Other paints, coatings, films, etc. having extremely high reflectivity or brightness may be used.

Optionally, in addition to the highly reflective or luminescent surface, the locking levers may have embossed, engraved, or other tactile features to facilitate their identification.

As will be appreciated, any number of locking levers may be used on the coupling.

Figure 2:
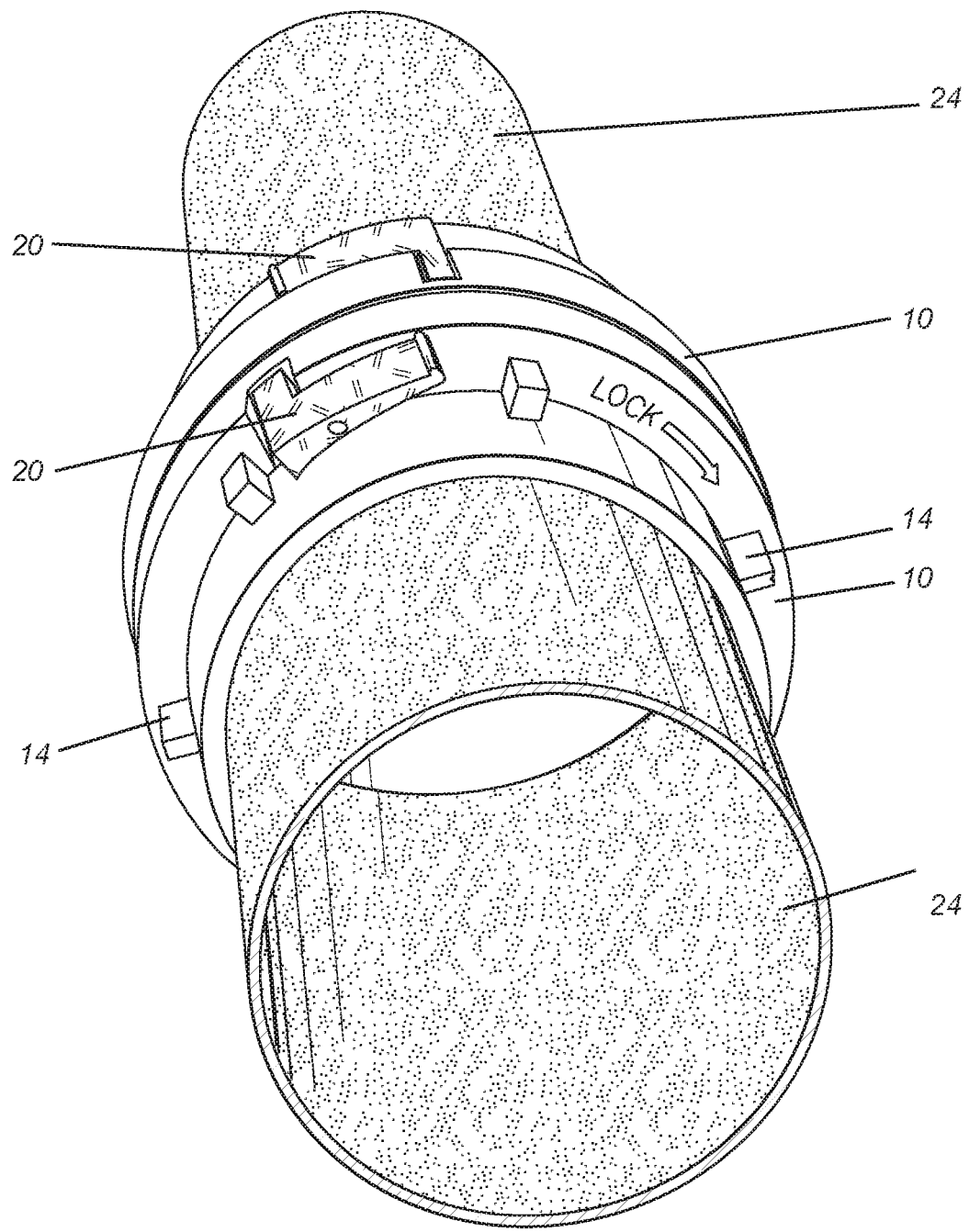
FIG. 2 is an isometric view of a fire hose assembly of two Storz-style couplings connected together in accordance with an embodiment of the present invention.

The novel coupling disclosed herein can be used as part of a novel fire hose assembly. FIG. 2 is an isometric view of one example of a fire hose assembly. In this embodiment, the assembly is composed of a pair of connected couplings 10 each having high-visibility locking levers 20. Each coupling 10, as shown by way of example in FIG. 2, is attached to a respective length of fire hose 24.

The novel coupling disclosed herein can also be used in a novel method of assembling lengths of fire hoses. The fire hoses are first connected by interconnecting the first and second couplings attached to each of the first and second fire hoses. The firefighter or other user then visually notes the location of each of the high-visibility locking levers on the first and second couplings. Thereafter, the firefighter or other user locks the couplings together by rotating the levers from the unlocked position to the locked position.

Similarly, the high-visibility locking levers may be useful in disassembling the conjoined lengths of fire hoses, especially when operating at night or in conditions of poor visibility. The locking levers are visually located by the firefighter or user then rotated manually from the locked position to the unlocked position. Thereafter, the couplings may be disconnected from one another by a quarter-turn rotation to disengage the lugs.

In summary, the coupling, assembly and methods disclosed above confer advantages over the prior art. The high-visibility locking levers are easily identified by the firefighter or other user. This facilitates assembly and disassembly in low light conditions. Furthermore, this novel technology enables firefighters to locate the levers visually and without having to resort to touch or tactile sensation to feel where the levers are located. Thus, the firefighter needs not remove his gloves in order to locate the locking levers on the couplings. This makes the task of assembling or disassembling fire hoses easier and quicker for the firefighter and far less inconvenient than having to remove one's gloves and stash them in a pocket before feeling the coupling for the levers. Furthermore, this novel technology improves safety for the firefighter since he need not remove his gloves to find the locking levers. As a consequence, the firefighter's hands remain fully protected while manipulating the levers.

This new technology has been described in terms of specific examples, embodiments, implementations and configurations which are intended to be exemplary only. Persons of ordinary skill in the art will appreciate that obvious variations, modifications and refinements can be made without departing from the scope of the present invention. The scope of the exclusive right sought by the Applicant is therefore intended to be limited solely by the appended claims.

The invention claimed is:

1. A coupling comprising:
   a substantially annular body having a first end connected to a fluid-carrying conduit and a second end for connecting to another coupling; and
   at least one locking lever movable between an unlocked position and a locked position, the lever locking the annular body of the coupling to the other coupling, wherein the at least one locking lever comprises a light-reflecting surface to improve visibility of the at least one lever relative to the body.

2. The coupling as claimed in claim 1 comprising a plurality of levers.

3. The coupling as claimed in claim 2 wherein the light-reflecting surface of the at least one lever comprises a super reflective metal film.

4. The coupling as claimed in claim 2 wherein the light-reflecting surface of the at least one lever comprises a photo luminescent coating.

5. The coupling as claimed in claim 2 wherein the light-reflecting surface of the at least one lever comprises a phosfluorescent coating.

6. The coupling as claimed in claim 1, comprising a plurality of equally spaced locking levers.

7. The coupling as claimed in claim 1 wherein the fluid-carrying conduit is a hose.

8. A hose assembly for improved visibility comprising:
   a first hose having a first coupling, wherein the first coupling comprises a body;
   a second hose having a second coupling adapted to be mechanically coupled to the first coupling to connect the first coupling to the second coupling; and
   at least one locking lever for locking the first coupling to the second coupling, wherein the at least one locking lever comprises a light-reflecting surface to improve visibility of the lever relative to the body.

9. The hose assembly as claimed in claim 8 comprising a plurality of levers.

10. A method of coupling hoses, the method comprising:
    providing a first hose having a first coupling, wherein the first coupling comprises a body;

providing a second hose having a second coupling adapted to be mechanically coupled to the first coupling;

connecting the first coupling to the second coupling using at least one locking lever that comprises a light-reflecting surface.

11. The method as claimed in claim 10 comprising a plurality of levers.

\* \* \* \* \*